United States Patent [19]

Ueda et al.

[11] Patent Number: 5,774,577
[45] Date of Patent: Jun. 30, 1998

[54] COMPACT IMAGE CONVERSION SYSTEM OPERABLE AT A HIGH SPEED

[75] Inventors: Hiroaki Ueda, Tokyo; Yushi Niwa, Osaka, both of Japan

[73] Assignee: NEC Corporation, Tokyo, Japan

[21] Appl. No.: 503,270

[22] Filed: Jul. 17, 1995

[30] Foreign Application Priority Data

Jul. 15, 1994 [JP] Japan ................................ 6-164307

[51] Int. Cl.[6] ................................................. G06K 9/00
[52] U.S. Cl. ................................... 382/162; 382/167
[58] Field of Search ......................... 395/131; 382/167, 382/162; 398/518, 519, 520, 521, 522, 523, 527

[56] References Cited

U.S. PATENT DOCUMENTS

| | | | |
|---|---|---|---|
| 5,204,665 | 4/1993 | Bollman et al. | 358/520 |
| 5,237,402 | 8/1993 | Deshon et al. | 358/520 |
| 5,255,083 | 10/1993 | Capitant et al. | 358/527 |
| 5,260,873 | 11/1993 | Hishinuma | 395/131 |
| 5,278,641 | 1/1994 | Sekizawa et al. | 382/167 |
| 5,289,293 | 2/1994 | Kato et al. | 358/457 |
| 5,347,374 | 9/1994 | Fuss et al. | 358/520 |
| 5,351,137 | 9/1994 | Kato et al. | 358/457 |
| 5,422,738 | 6/1995 | Ishihara et al. | 358/518 |
| 5,477,345 | 12/1995 | Tse | 358/500 |
| 5,489,998 | 2/1996 | Yamada et al. | 358/518 |
| 5,495,428 | 2/1996 | Schwartz | 382/274 |

FOREIGN PATENT DOCUMENTS 1-263780  10/1989  Japan .
3-011477  1/1991  Japan .

*Primary Examiner*—Yon Couso
*Attorney, Agent, or Firm*—Foley & Lardner

[57] ABSTRACT

In an image conversion system including a first table connected to image input device and image output device, the first table is for use in converting a plurality of color information numbers restricted dependent on the image output device into a plurality of color information to be displayed. The image conversion system further has a second table indicated by an image input data supplied from the image input device to produce the color information numbers, first conversion unit for converting the image input data into the color information numbers with reference to the second table, and second conversion unit for converting the color information numbers into the color information with reference to the first table.

14 Claims, 17 Drawing Sheets

|   | Red | Green | Blue |
|---|-----|-------|------|
| 0 | 198 | 238 | 230 |
| 1 | 160 | 160 | 160 |
| 2 | 242 | 228 | 228 |
| 3 | 98 | 142 | 150 |
| ⋮ | ⋮ | ⋮ | ⋮ |
| 255 | ⋮ | ⋮ | ⋮ |

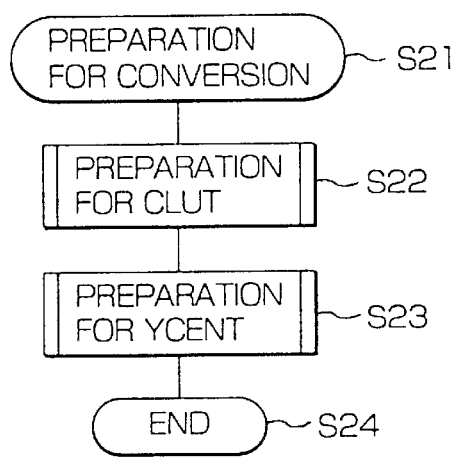
FIG. 5
FIG. 6(A)
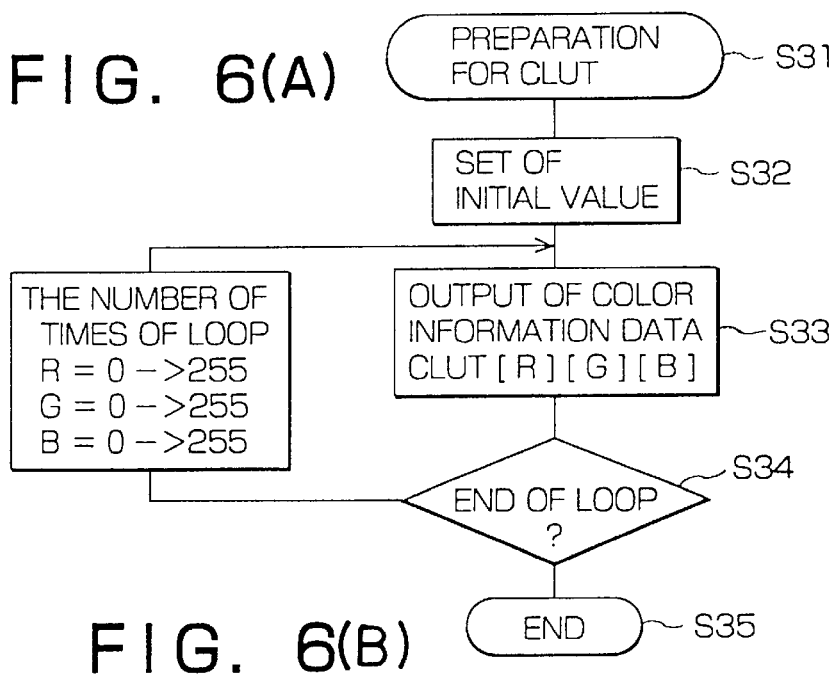
FIG. 6(B)
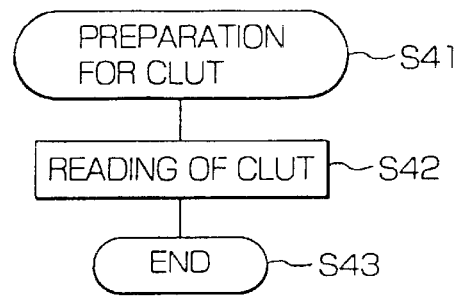

COMPACT IMAGE CONVERSION SYSTEM OPERABLE AT A HIGH SPEED

BACKGROUND OF THE INVENTION

This invention relates to an image conversion system which uses a display device with a limited number of colors at the same time and displays such as a natural image which requires a production of more than sixteen millions colors at the same time.

A conventional image conversion system jointly uses processing of dither Or error diffusion in order to remove unnaturalness due to image expression based on the limited numbers of colors.

An example of such a conventional image conversion system is disclosed in Unexamined Japanese Patent Application H1-263780. The conventional image conversion system disclosed therein expresses a color image by components of a uniform color space. In the image conversion system, a corresponding picture element value of a dither pattern is added to each picture element of the color image to obtain modulated picture element values. The modulated picture element values are expressed by the nearest representative colors among a set of representative colors sampled at equal intervals within expressible areas of the uniform color space.

Another example of a conventional image conversion system is disclosed in Unexamined Japanese Patent Application H3-11477. In the conventional image conversion system disclosed therein, conversion processing of a color space to which an image data belongs is carried out at the same time when processing of enlargement or reduction of images is carried out. The image conversion system uses processing of dither or error diffusion with respect to density or luminance of the converted picture elements.

However, signals of a color space dependent on an image input device must be converted into those of another color space dependent on an image display device in the conventional image conversion systems mentioned above. Further, it is also required that the above-mentioned representative colors are decided among the converted color signals. Inevitably, it needs a large quantity of operations to carry out the conversion of the color spaces. As a result, the conversion is cumbersome when the image conversion is carried out by a processor of poor operational capacity.

In order to reduce the quantity of operations, appropriate representative colors are often assigned to an image data prior to input. An image constructed by the number indicating the representative color is then supplied to the image conversion system. However, it is generally difficult to obtain effective efficiency of compression and extension of images in a system for the purpose of image data transmission by compression and extension of the images.

On the other hand, when the aforesaid approximation of colors by dither method is used, it sometimes occurs that straight lines independent from input images appear as interference fringes.

SUMMARY OF THE INVENTION

It Is therefore an object of this invention to provide an image conversion system in which the image conversion is carried out at a high speed.

Other objects of this invention will become clear as the description proceeds.

According to this invention, there is provided an image conversion system comprising: a first table which is connected to image input means and image output means and which is for use in converting a plurality of color information numbers which correspond to the image output means into a plurality of corresponding colors to be displayed; a second table which is indicated by an image input data supplied from the image input means to produce the plurality of color information numbers; first conversion means for converting the image input data into the plurality of color information numbers with reference to the second table; and second conversion means for converting the plurality of color information numbers into the plurality of corresponding colors with reference to the first table.

The image input data may be subsampled at regular intervals in a space direction, and the first conversion means may comprise additional conversion means for converting the image input data into the plurality of color information numbers with reference to the second table.

At least either the first table or the second table may be previously prepared.

The image conversion system may further comprise third conversion means which produces enlarged color information numbers by the first conversion means.

The image conversion system may further comprise fourth conversion means which produces reduced image color information numbers by the first conversion means.

The image conversion system may further comprise fifth conversion means which alternates writing mode of the image input data dependent on an output position to the image output means.

The image conversion system may further comprise first table making means for making the first table and second table making means for making the second table from the first table.

The image input data may be compressed by a predetermined means to produce a compressed image input data, and the first conversion means may comprise: data processing means for extending the compressed image input data in accordance with a predetermined algorithm to produce an image processing data of a format following a color apace dependent on the data processing means; and additional conversion means for converting the image processing data into the plurality of color information numbers with reference to the second table.

The image input data may be subsampled at regular intervals in a space direction.

BRIEF DESCRIPTION OF THE DRAWINGS

FIG. 5 is a flow chart which shows an operation of preparation for conversion according to the embodiment of this invention.

FIG. 6(A) is a flow chart which shows an operation of preparation for CLUT according to the embodiment of this invention.

FIG. 6(B) is a flow chart of a modification of that illustrated in FIG. 6(A).

DESCRIPTION OF THE PREFERRED EMBODIMENTS

Figure 1A:
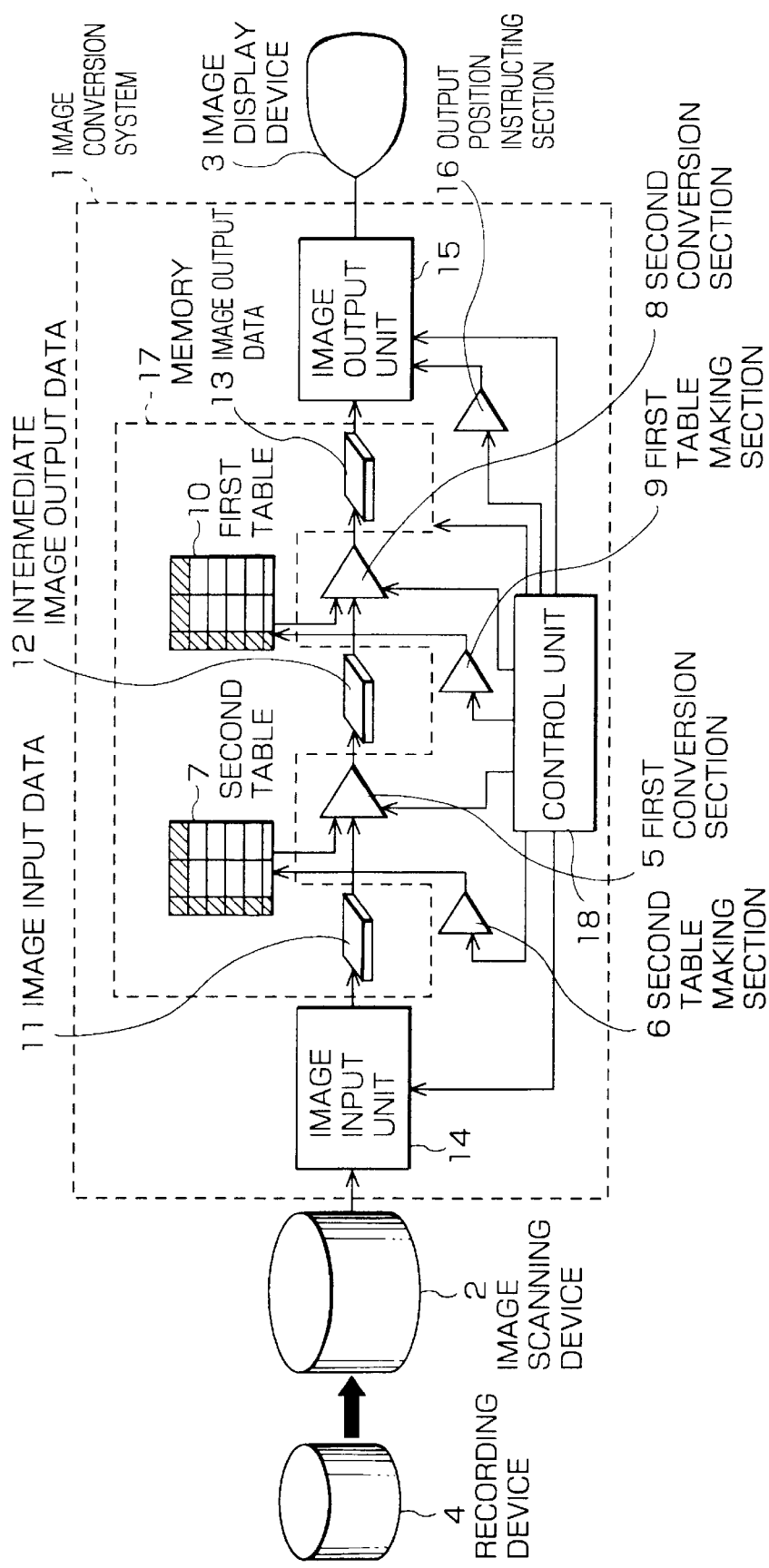
FIG. 1(A) is a block diagram of an image conversion system according to a first embodiment of this invention.

Referring now to FIG. 1(A), description will proceed to an image conversion system according to a first embodiment of this invention.

As illustrated in FIG. 1(A), the image conversion system 1 comprises an image input unit 14 and an image output unit 15. The image conversion system 1 includes a first table 10 which is for use in converting a plurality of color information numbers. The number being restricted dependent on the image output unit 15 into a plurality of output information corresponding to colors to be displayed. The system 1 also includes a second table 7 which corresponds to an image input data 11 supplied from the image input unit 14. The second table 7 is used, along with the image input data 11, to produce the plurality of color information numbers. A first conversion section 5 converts the image input data 11 into an intermediate image output data 12 with reference to the second table 7. A second conversion section 8 converts the intermediate image output data 12 into the image output data 13 with reference to the first table 10.

In FIG. 1(A), each section of the image conversion system 1 according to this embodiment is controlled by the control unit 18. The image conversion system 1 is connected to both an image scanning device 2 and an image display device 3. As illustrated in FIG. 1(A), the image conversion system 1 comprises the image Input unit 14 for retrieving the image input data 11 from the image scanning device 2, the image output unit 15 for providing an eventual image output data 13 for the image display device 3. An output position instructing section 16 instructs the image output unit 15 with a position where the image output data 13 is to be outputted. A first table making section 9 prepares the first table 10. A second table making section 6 prepares the second table 7. The first conversion section 5 produces the intermediate image output data 12 in response to information obtained from both the second table 7 and the image input data 11 received from the image scanning device 2. The second conversion section 8 produces the image output data 13 in response to information obtained from both the first table 10 and the intermediate image output data 12.

In this image conversion system 1, it is assumed that the image input data 11, the intermediate image output data 12, the image output data 13, the first table 10, and the second table 7 are all stored in various regions of a memory 17.

For example, the image input unit 14 may be constructed from an image input device such as a CCD camera. Further, the image input unit 14 may be constructed from a reading portion of a file, and the like. Alternatively, the image input unit 14 may be constructed from an image data input method using communication. In such a case, data communication or recording of the image data into a recording medium is carried out in a recording device 4.

For example, the image output unit 15 may be a display control for the image display device 3, which may be a color display device. Further, the image output unit 15 may be constructed from a writing portion of a file, and the like. Alternatively, the image output unit 15 may be constructed from an image data output method using communication.

Figures 3, 4:
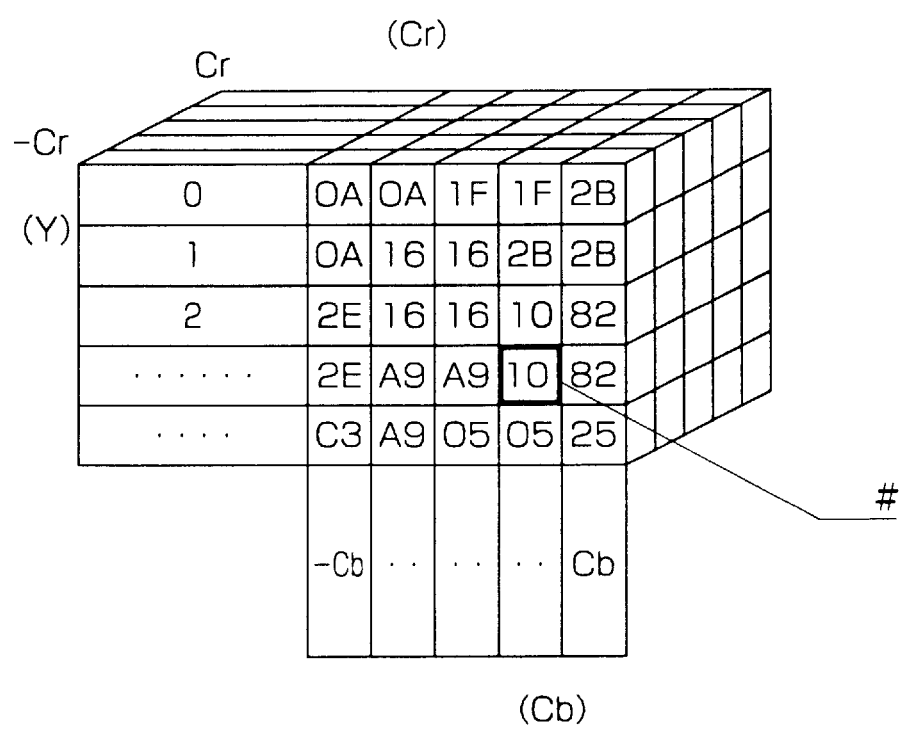
FIG. 3 shows a concept of CLUT.
FIG. 4 shows a concept of YCENT.

If necessary, the control unit 18 makes both the first table making section 9 and the second table making section 6 operate. Herein, the first table making section 9 selects limited colors representative of the whole color space capable of being displayed, each limited color being represented by a limited color number. The second table making section 6 makes a conversion table as the second table 7. In this case, the conversion table consists of a table of numbers, with each entry indicating an optional n color (the table of numbers corresponding to YCENT as illustrated in FIG. 4) with color information corresponding to one of the limited colors (the limited colors corresponding to entries in the CLUT as illustrated in FIG. 3) selected in response to the image output data. Herein, n represents numbers for the dither patterns of the dither method used in the image conversion system 1. The CLUT and the YCENT are expanded to the sequential areas which start from an optional address of the memory 17. A software program and a working space for the operation of the control unit 18 are prepared in the memory 17. An operation required for each of the image input and the image output operations is stored within the image input unit 14 and the image output unit 15. The image input data 11 is read into the memory 17 and read from the memory 17 as the image output data only by the operation instructions of the control unit 18.

Figure 1B:
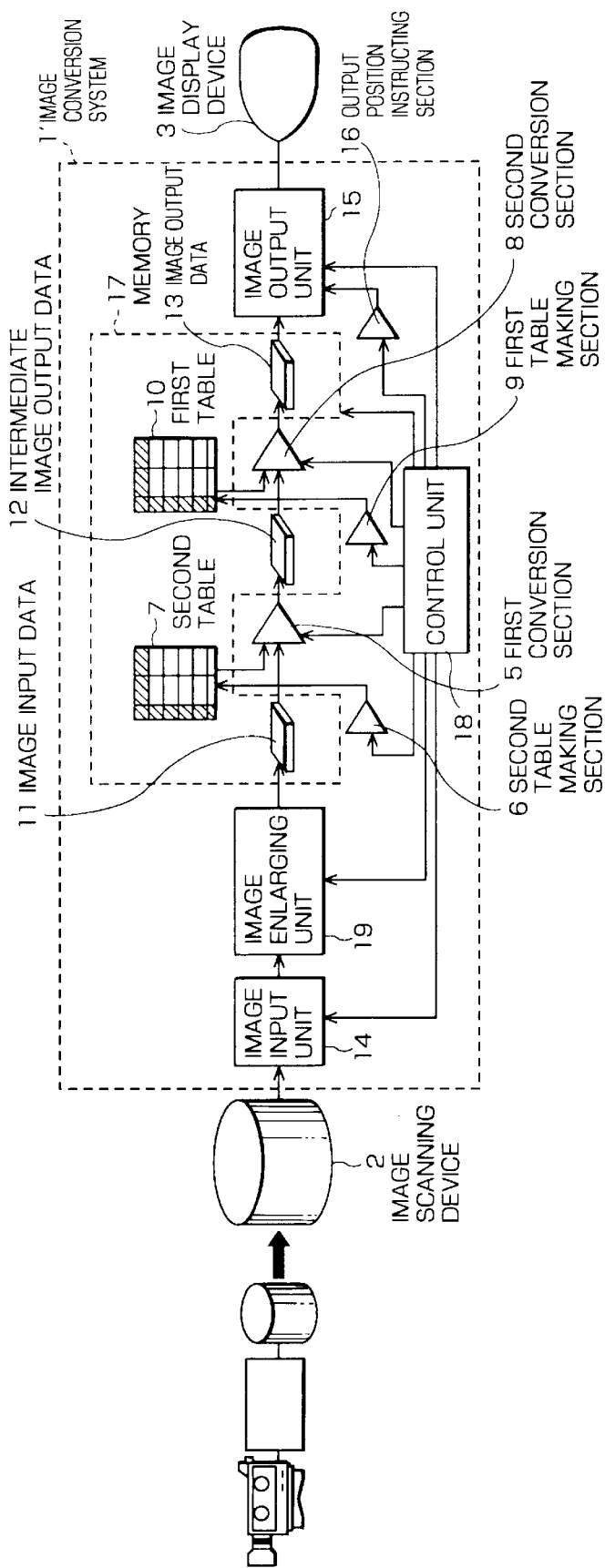
FIG. 1(B) is a block diagram of an image conversion system according to a modification of the image conversion system illustrated in FIG. 1(A).

Referring to FIG. 1(B), description is made about a modification of the image conversion system 1 illustrated in FIG. 1(A), The image conversion system 1' further comprises an image enlarging unit 19 for carrying out an image enlargement operation in addition to the control unit 18. The image enlarging unit 19 reads the necessary data from the memory 17 to carry out the image enlargement operation thereto. Thereafter, the image enlarging unit 19 writes the enlarged image data into the memory 17.

Figure 2:
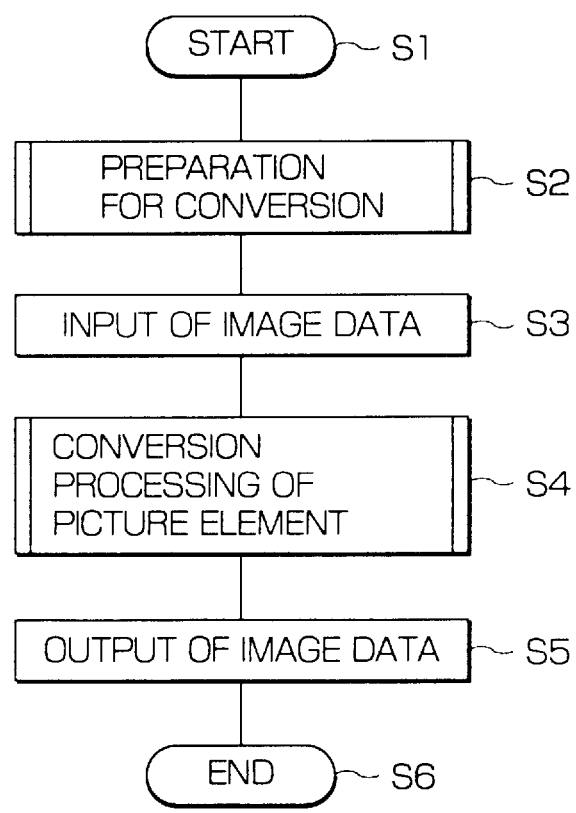
FIG. 2 is a flow chart which includes an operation of making a conversion table.

Referring to FIG. 2 with reference to FIG. 1(A) continued, description will proceed to an operation of the image conversion system 1. The description is made with an example of the image input data 11 of one frame. Detailed description will later be made, as a conversion preparing stage, regarding operations of the first and the second conversion sections 5 and 8. In the description, it is assumed that the image input unit 14 is a file input and the image output unit 15 is a color display controller.

FIG. 2 shows a flow chart of the operation of the image conversion system 1 illustrated in FIG. 1(A). Referring to FIG. 2, at first, a conversion operation of the image data is started (Step 1). A preparation for the conversion is then carried out as the conversion preparing stage (Step 2). In the preparation for the conversion, the CLUT and the YCENT are expanded on the memory 17. In the present invention, the color space is not restricted in the image output data 13. However, in this embodiment, description is made with an example of RGB format as the image output data format. In addition, it is assumed in the description that the number of colors registrable into the CLUT is two-hundred and fifty six. The colors registered in the CLUT are numbered for distinction from each other. Each number is called an entry and the CLUT is defined by sequential entries which start from zero. Next, an object image data is read into an optional area of the memory 17, as the image input data 11, to carry out the image data input (Step 3). The quantity of the image input data read at one time is variable, since it depends on a capacity of the memory 17 prepared in the image conversion system 1. However, it is necessary that at least one picture element is read at one time operation. Further, the color space is not restricted with respect to a format of the image input data 11 in the present invention. For example, when the analog image signals used in television systems are converted into digital image signals, the image data is often represented by a data format of Y/Cr/Cb data format by luminance and chrominance information. In this embodiment, description is made with such an Y/Cr/Cb data format as an example of the image input data format. After the reading of the object image data, the operation proceeds to a stage of picture element conversion operation carried out by the first conversion section 5 (Step 4). In this stage, the image input data 11 is converted into the intermediate image output data 12 per optional numbers of the picture elements by the use of the CLUT and the YCENT previously prepared. In the first conversion, a parameter D is produced by obtaining energy levels of optional bit numbers from the upper grade bits per each independent energy level of the image input data 11 and calculating a logical OR of the remaining effective bits so as not to influence to each other. In the first conversion, a content of YCENT is referenced by the use of the parameter D with an offset of D×n+k (=an address value ADR) from a heading address of the YCENT. The referenced content is written as the intermediate image output data 12. Herein, k is determined dependent upon a designation of the output position and a deformation ratio (expansion, the same magnification, reduction), or the like of the image output data 13. Further, in the image data output stage (Step 5), the entry produced in the picture element conversion operation stage of Step 4 is stared in the corresponding area of the memory 17 in accordance with a position information of the original image and an instruction from the output position instructing section 16. Thereafter, a second conversion is carried out in the color display, in which the conversion into picture element information of RGB format is done in response to the value of the entry with reference to the CLUT to finish the output of the image data. In the second conversion, the intermediate image output data 12 is produced with reference to the YCENT per one picture element and by the use of an entry C obtained from the YCENT with an offset of C×m from the heading address of the CLUT. Herein, m represents a quantity of informations (for example, twenty four bits) for a representation of one color by the RGB format. The operations mentioned above are repeated according to a size of the input image to finish the image conversion operation of one frame.

Referring to FIG. 5, detailed description is made about the conversion preparation stage (Step 2) illustrated in FIG. 2. The conversion preparation stage includes a CLUT preparation stage (Step 22) and a YCENT preparation stage (Step 23). First, conversion preparation stage is started (Step 21). The CLUT preparation stage (Step 22) is then carried out. Next, the YCENT preparation stage (Step 23) is carried out. Thereafter, the CLUT and the YCENT are stored in the memory 17 to finish the conversion preparation stage (Step 24).

Referring to FIGS. 6(A) and 6(B), detailed description is made about the CLUT preparation stage (Step 22) illustrated in FIG. 5, in which the CLUT is stored in the memory 17 to be ready for the use of following conversion operations. FIG. 6(A) shows an example in which the CLUT is made in the CLUT preparation stage (Step 22) to finish such a preparation while FIG. 6(B) shows another example in which the CLUT previously prepared is read from a file in the CLUT preparation stage (Step 22) to finish the preparation. Description is made with reference to FIG. 6(A). In FIG. 6(A), the CLUT preparation is started (Step 31). Next, the number of loops is determined so that the values of RGB independent from each other may be dispersed or diverged to an approximately uniform extent in order to correspond colors to all the input image (all the scopes of RGB space) by one CLUT. As numbers of colors to be selected are limited up to two-hundred and fifty six, the number of loops for each color element is defined by L (L: $256 \geq (L)^3$), and the entry is represented by one byte. By this number of loops L, in each color element R/G/B, the value (R1-RL, G1-GL, B1-BL) divided equally by L from the scope capable of being expressed by the color element are combined so as not to be overlapping each other. The combination of the values is expanded an the optional area of the memory 17 (Step 32). The operation is repeated by the times of the number of loops $L^3$ (Step 33). The CLUT preparation is finished when the operation of the L times operation comes to an end (Step 34).

Figure 7A:
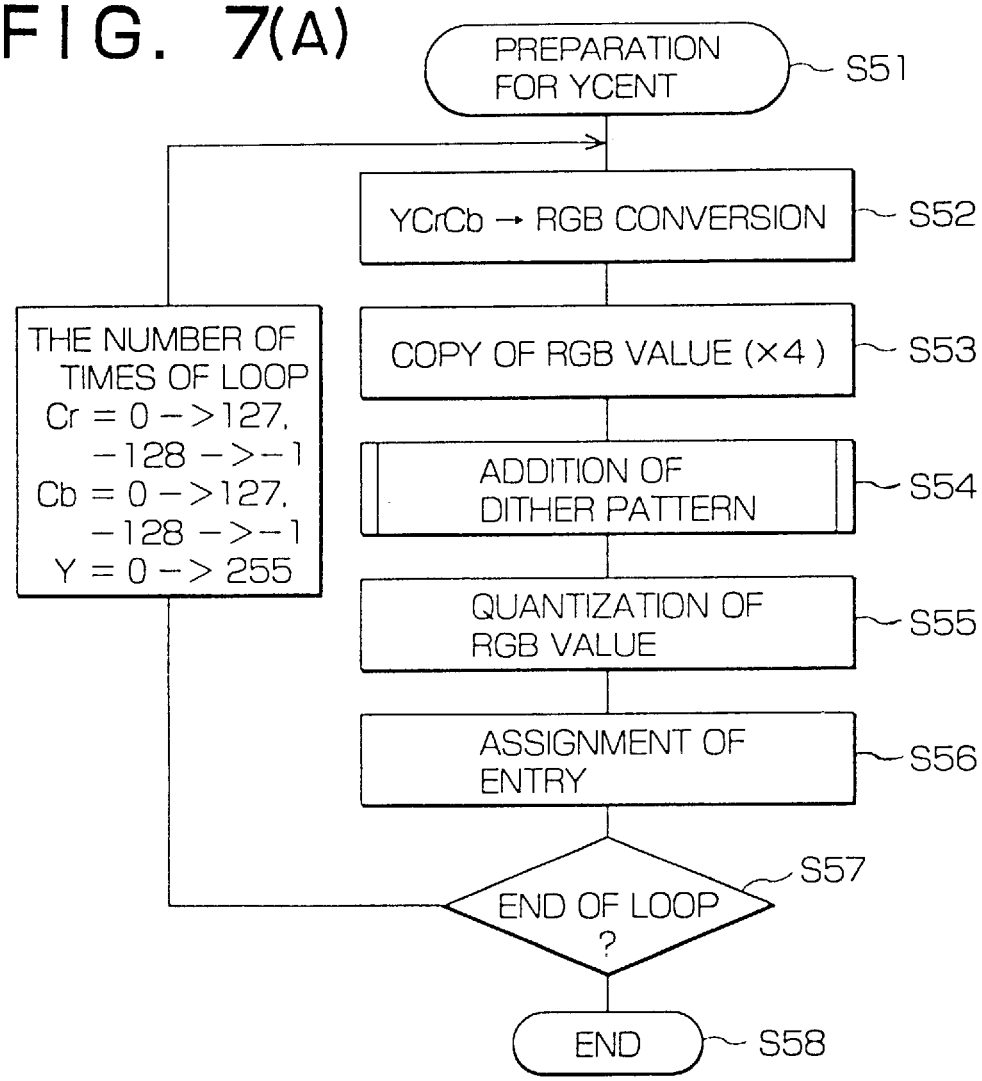
FIG. 7(A) is a flow chart which shows an operation of preparation for YCENT according to the embodiment of this invention.
Figure 7B:
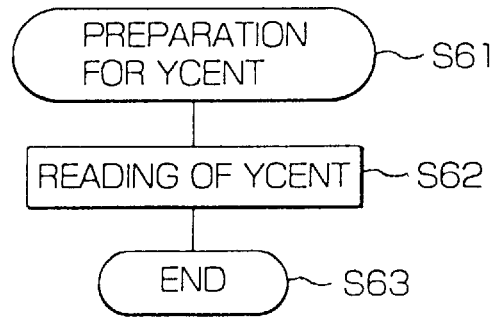
FIG. 7(B) is a flow chart of a modification of that illustrated in FIG. 7(A).
Figure 11A:
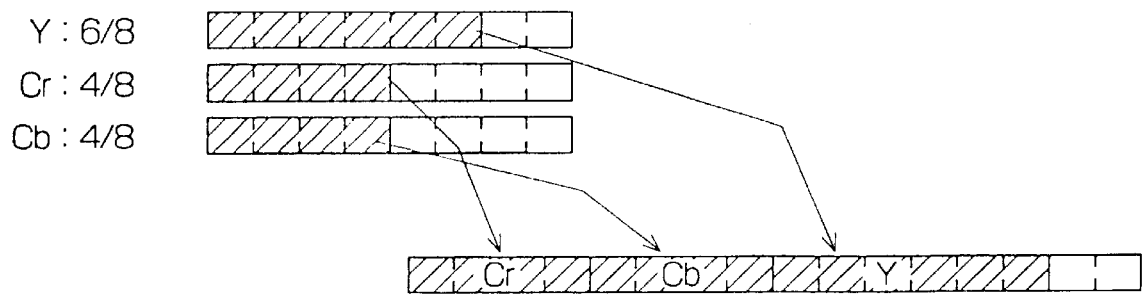
FIG. 11(A) shows a concept of a quantization operation of a picture element value according to the embodiment of this invention.
Figure 13:
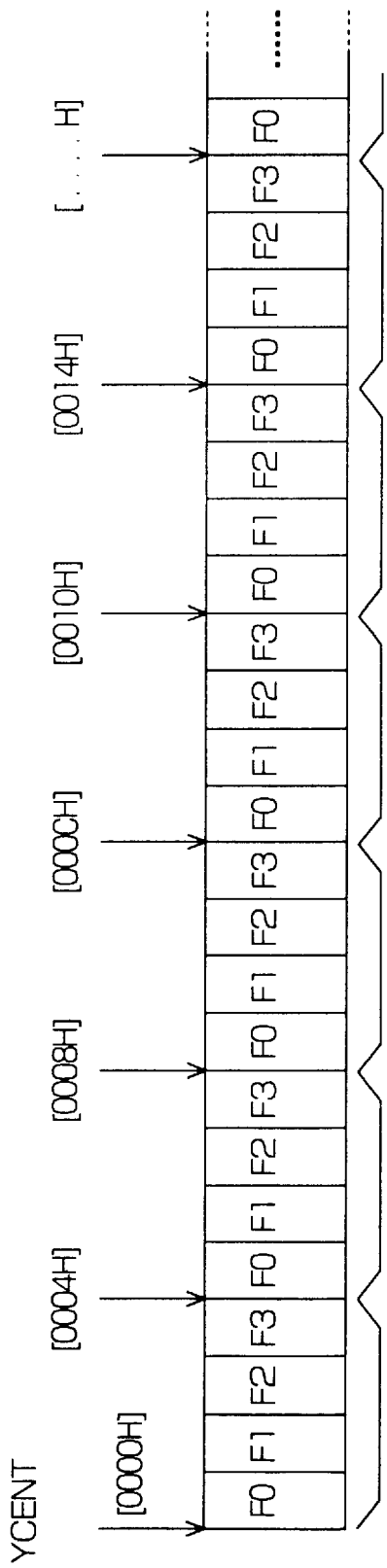
FIG. 13 shows a concept in which YCENT of the embodiment is positioned on memory.

Referring to FIGS. 7(A) and (B), detailed description is made about the YCENT preparation stage (Step 23) illustrated in FIG. 5. The flow of the YCENT preparation is shown in FIGS. 7(A) and (B). FIG. 7(A) shows an example in which the YCENT is made in the YCENT preparation stage (Step 23) to finish the preparation while FIG. 7(B) shows another example in which the YCENT previously prepared is read from a file in the YCENT preparation stage (Step 23) to finish the preparation. Description is made with reference to FIG. 7(A). In FIG. 7(A). the YCENT preparation is started (Step 51). Next, an initial value of parameters and the number of loops required for making the YCENT are determined. In the interim, the YCENT is a table of the numbers indicating the optional n color among the CLUT, that is a color information table of the selected colors against the color expression space of the image output unit 15. Accordingly, in this embodiment, the YCENT may be such one as making all the available values (Y: 0 through 255, Cr: −128 through +127, Cb: −128 through +127) correspond to each of selected colors (two-hundred and fifty six colors) in the RGB space against Y/Cr/Cb data format. Each value of the Y, Cr and Cb is an example in which each of the Y, Cr and Cb is normalized by eight bits. A conceptual of illustration of the YCENT was shown in FIG. 4. FIG. 13 further shows a concept of the YCENT arranged on the memory 17. In this embodiment, as an example in which the memory areas for the YCENT are saved, only effective bits of six bits, four bits, and four bits are utilized with respect to each value of Y/Cr/Cb, as illustrated in FIG. 11(A). Next, the values of Y/Cr/Cb format are converted into the values of RGB format (Step 52). Let the value of Y/Cr/Cb format be CY(Y, Cr, Cb), the value converted into RGB format is F(R, G, B). When the CY and the F are normalized by eight bits, an equation of the conversion is represented as follows;

$$R = Y + 1.402 \times Cr,$$

$$G = Y - 0.344 \times Cb + 0.714 \times Cr.$$

$$B = Y + 1.772 \times Cb$$

Figure 8:
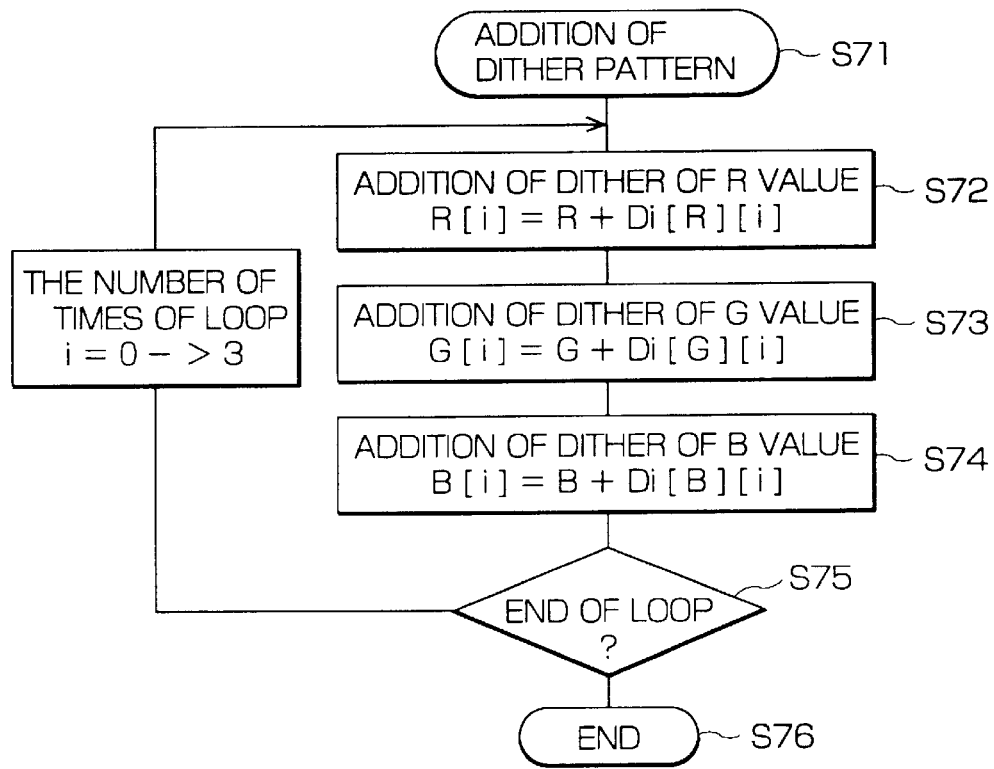
FIG. 8 is a flow chart which shows an operation of addition of a dither pattern according to the embodiment of this invention.

As the dither pattern in this embodiment is 2×2, the value F is copied and four copied values $F_0$–$F_3$ are prepared (Step 53). The dither pattern is added to each of the four copied values $F_0$–$F_3$ (Step 54). Herein, it is assumed that the added values are defined as $F_{d0}$–$F_{d3}$. The addition of the dither pattern is depicted in FIG. 8. Referring to FIG. 8, at first, a table including the dither values is previously prepared. The dither values included in the table are added to the above-mentioned RGB values (Steps 71–75). Besides, the dither values are dependent on an algorithm of dither method. Referring back to FIG. 7(A), the operation proceeds to quantization stage of the RGB values in which the RGB values are assigned to the nearest colors in the color information of the previously prepared CLUT, respectively (Step 55). In the RGB format, R, G and B are parameters independent from each other. In order to assign the RGB values to the nearest colors, relative distances are first calculated in a three-dimensional space between RGB values of all candidate or nominated colors and the value $F_{d0}$. A color having the smallest relative distance is then determined to be an approximate color of $F_{d0}$. Similar operations are carried out with respect to $F_{d1}$–$F_{d3}$. Accordingly, four nominated colors are determined concerning the value CY. Let the YCENT data be made for a CC-th color. The entries of the color $n_0$–$n_3$ are sequentially stored at addresses CC×4 bytes offset from the heading address of the YCENT (Step 56). Similar operations are repeated (Step 57) as to the whole of the color space in the aforesaid Y/Cr/Cb format to finish the preparation of the YCENT (Step 58).

Figure 9:
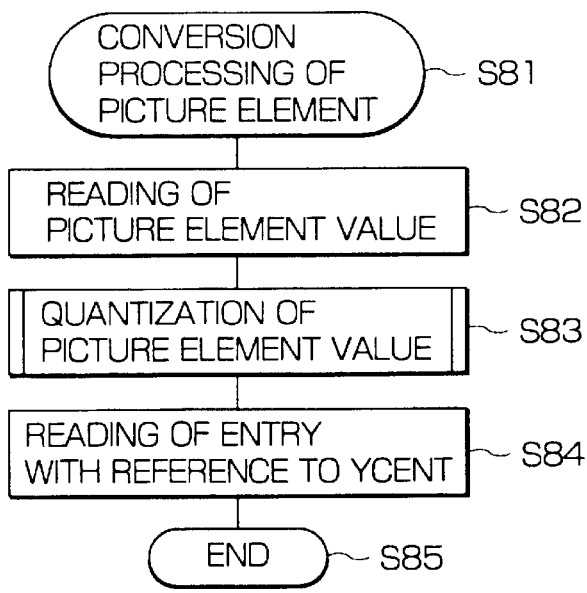
FIG. 9 is a flow chart which shows an operation of conversion processing of picture element.

Referring to FIG. 9, detailed description is made about the picture element conversion operation (Step 4) illustrated in FIG. 2. In FIG. 9, with the image input data supplied at the image data input stage (Step 3), the picture element conversion operation (Step 4) is started (Step 81). Next, image data of an optional number of picture elements is read into the working area on the memory 17 in the picture element value reading stage (Step 82). Herein, it is assumed that a picture element value of a picture element is read into the working area on the memory 17, The picture element value is defined, for example, as an input picture element value A (Y=200, Cb=67, Cr=−123). The parameter D is produced by the use of the input picture element value A in the picture element value quantization stage (Step 83). The entries stored in optional areas of the YCENT indicated by the address value ADR are read by the control unit 18 in the YCENT referenced entry reading stage (Step 84). After the operation in the Step 84, the picture element conversion operation comes to an end (Step 85). In accordance with a size of the image to be processed, these operations may be repeated. In the picture element conversion operation stage (Step 4), the image input data of Y/Cr/Cb format is converted into corresponding entries with reference to the table.

Figure 10:
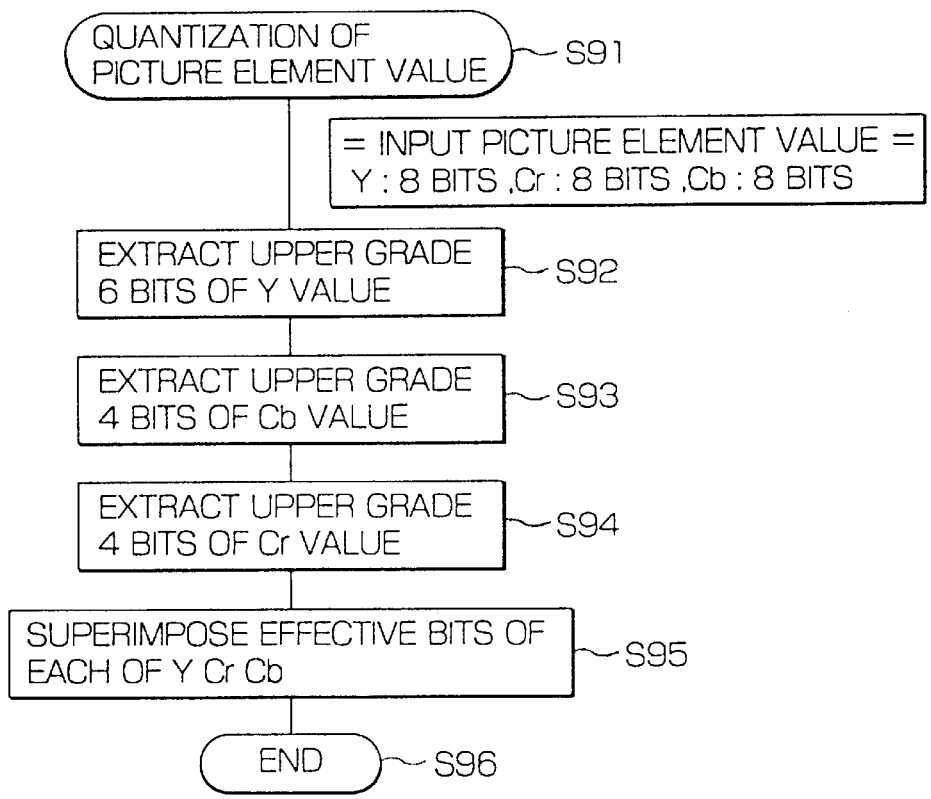
FIG. 10 is a flow chart which shows an operation of quantization of picture element value.

Referring to FIGS. 10 and 11(A), detailed description is made about the picture element value quantization stage (Step 83) illustrated in FIG. 9. In FIGS. 10 and 11(A), with input picture element values A each of which has eight bit accuracy, the picture element value quantization is started (Step 91). In this embodiment, the effective (i.e. upper grade) bits of the YCENT are determined to be Y: 6 bits, Cr: 4 bits, and Cb: 4 bits. As to Y of the example input picture element value A, an AND operation between 11001000 (binary numeral for y=200) and 11111100 (binary numeral for masking upper 6 bits) is carried out to obtain upper 6 bits of the Y value (Step 92). As to Cb of the input picture element value A, an AND operation between 01000011 (binary numeral for b=67) and 11110000 (binary numeral for masking upper 4 bits) is carried out to obtain upper 4 bits of the Cb value (Step 93). As to Cr of the input picture element values A, an AND operation between 10000101 (binary numeral for Cr=123) and 11110000 (binary numeral) is carried out to obtain upper 4 bits of the Cr value (Step 94). As a result, Y: 11001000 (binary numeral), Cb: 01000000 (binary numeral), and Cr: 10000000 (binary numeral) are obtained. Next, effective bits of each of Y/Cr/Cb are superimposed (Step 95). The superimposition is realized by obtaining an OR operation between the Y/Cr/Cb values after the effective bits are captured. The OR is taken with a value of Cr which is 8 bits shifted to the upper bit side, a value of Cb which is 4 bits shifted to the upper bit side, and a value of Y as it is. The value produced by the superimposition is equal to four times the parameter D and will be called "parameter AD". By producing the parameter AD, the picture element value quantization operation comes to an end (Step 96).

Figure 12A:
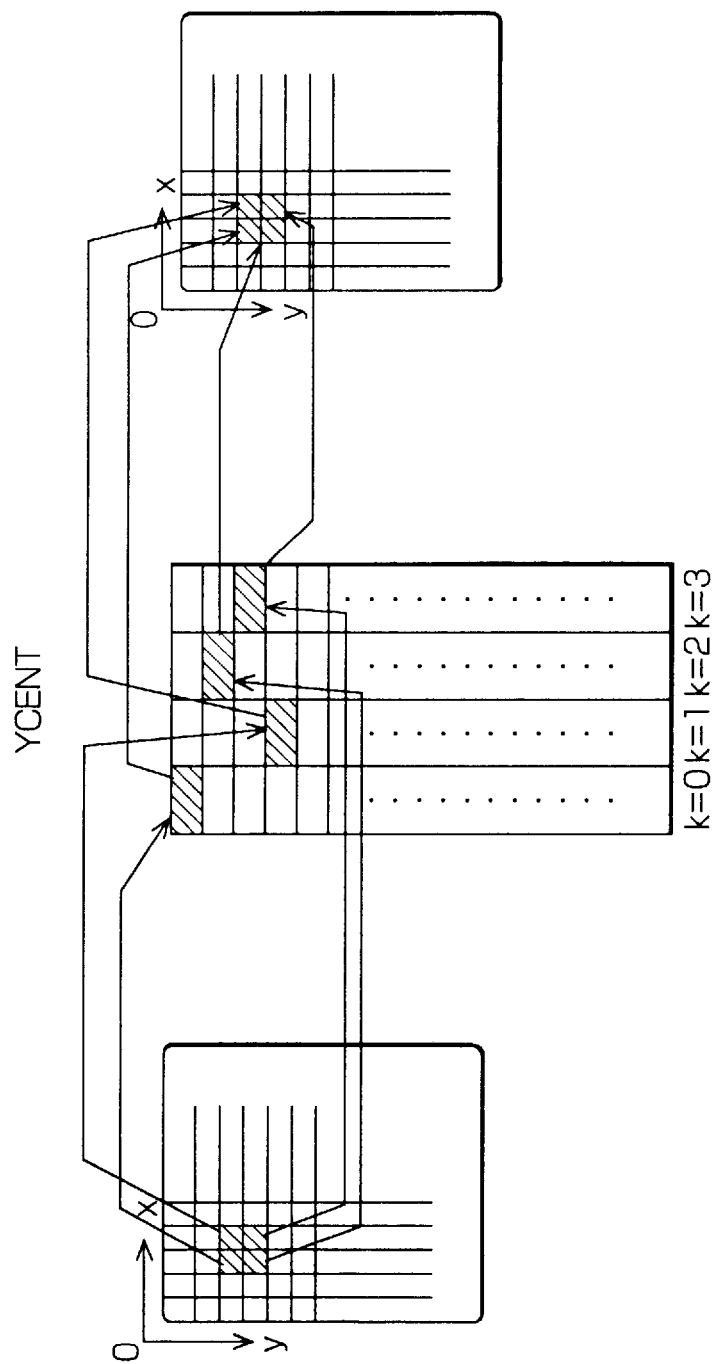
FIG. 12(A) shows a concept in which an output image is equal in size to the input image of original size.

The address value ADR is produced by the parameter AD and a variable k to be an address value by which an optional area of the YCENT is designated. Description is now made about a production of the variable k. The variable k is dependent on a spatial position information on a color display which serves as an output device. In a case that a dither pattern of 2×2 is used, like in this embodiment, the variable k ranges the values 0 to 3. The dither is a method for realizing a luminance of a certain picture element uniformly by area modulation by the use of some surrounding picture elements. In response to position information of the picture element, it is determined which value is assigned among the values $n_0$ to $n_3$. Therefore, k is determined by an output position from an optional reference point in the image supplied from image output position indicating unit 27. Description is made about the determination of k with reference to FIG. 12(A).

For example, let the reference point be a left upper vortex of a rectangular image (coordinate values x=0, y=0). In such a case, $n_0$ is assigned when the position of the object picture element is (x=2, y=2). $n_1$ is assigned when the position of the object picture element is (x=3, y=2). $n_2$ is assigned when the position of the object picture element is (x=2, y=3). $n_3$ is assigned when the position of the object picture element is (x=3, y=3). Namely, when each of x coordinate and y coordinate is a multiple of two, k=0. When x coordinate is a multiple of two but y coordinate is not a multiple of two, k=1. When x coordinate is not a multiple of two but y coordinate is a multiple of two, k=2. When each of x coordinate and y coordinate is not a multiple of two, k=3. Under the above conditions, k is produced.

Figure 11B:
FIG. 11(B) shows a concept of a first modification of that illustrated in FIG. 11(A).
Figure 11C:
FIG. 11(C) shows a concept of a second modification of that illustrated in FIG. 11(A).

In this embodiment, it is alternatively considered that each of the previously produced CLUT and YCENT may be supplied as an input without CLUT and YCENT being produced in this system. In this case, an operation for supplying the CLUT and YCENT as the input constitutes a modification of conversion preparation stage. According to this embodiment, in the operation that effective bits of each of Y/Cr/Cb are superimposed (Step 95), the superimposed bit patterns may be alternatively those illustrated in FIGS. 11(B) and (C). Further, it is possible to obtain the object bit patterns by the use of another operations different from that of this embodiment.

Figure 12B:
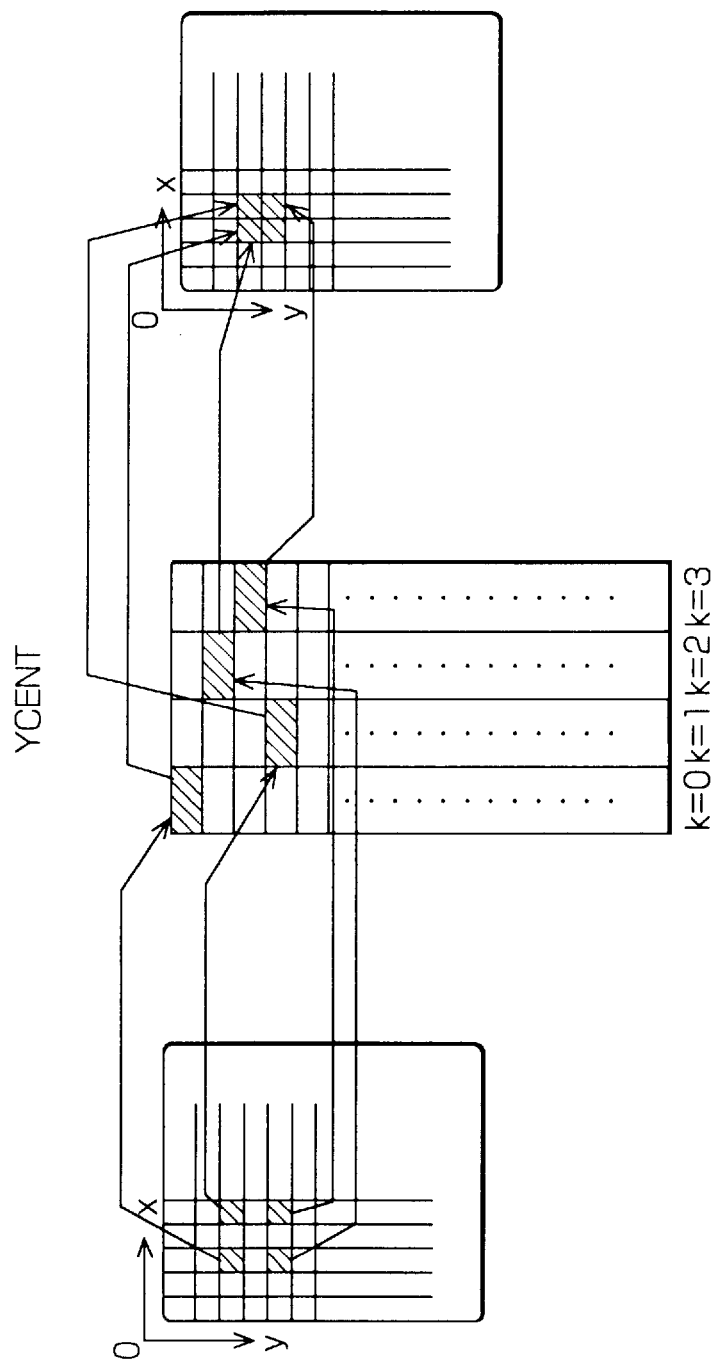
FIG. 12(B) shows a concept in which an output image is enlarged twice as large as the original size.

Referring to FIG. 12(B), description will proceed to an image conversion system according to a second embodiment of this invention, in which an output image is enlarged twice as large as the original size in both horizontal and vertical directions.

In this embodiment, the calculation of the parameter k is omitted in the entry reading stage with reference to the YCENT (Step 64) of the picture element conversion operation (Step 4). The parameter AD is directly substituted for the address value ADR. The data EN is thereafter realized as follows: sequential four bytes (corresponding to four picture elements) are read from the address value ADR per an operation of one picture element. The upper grade two bytes (corresponding to data of k=0 and k=1) are produced as an output of the entry which is positioned with x coordinate being a multiple of two (for example, x=2) and y coordinate being a multiple of two (for example, y=2) and with x coordinate being 3 and y coordinate being 2 in the picture element data output stage (Step 5). Further, the lower grade two bytes (corresponding to data of k=2 and k=3) are produced am an output of the entry which is positioned with x coordinate being 2 and y coordinate being 3 and with x coordinate being 3 and y coordinate being 3 also in the picture element data output stage (Step 5). The enlargement of the output image is thus achieved.

Figure 12C:
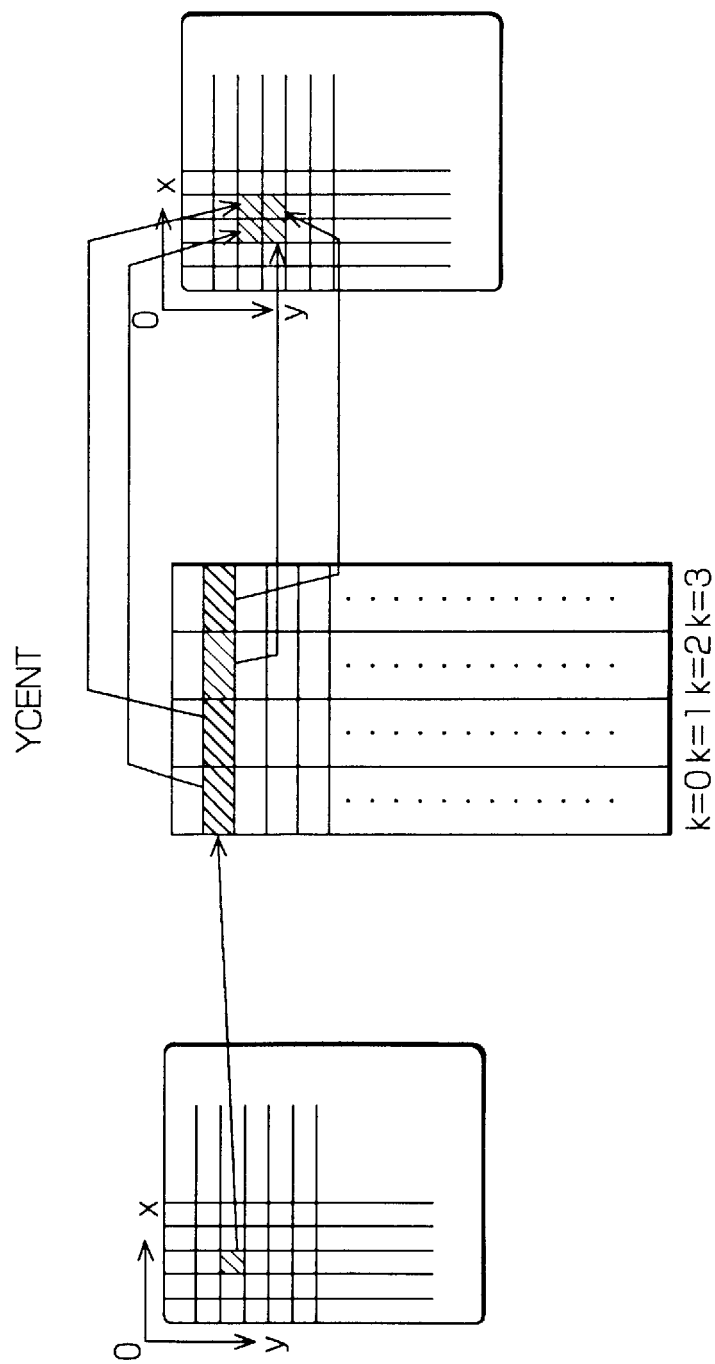
FIG. 12(C) shows a concept in which an output image in reduced to half of the original size.

Referring to FIG. 12(C), description will proceed to an image conversion system according to a third embodiment of this invention, in which an output image is reduced to half of the original size in both horizontal and vertical directions. In the image data input stage (Step 3), an image information of Y/Cr/Cb format is subsampled per two picture elements in both horizontal and vertical directions to be stored in the memory 17, so that reduction of the output image is achieved. In addition, as a modification of the third embodiment, picture element conversion operation (Step 4) is carried out by being subsampled per two picture elements in both horizontal and vertical directions to achieve the reduction of the output image.

In the third embodiment, a reduction ratio varies in a range of 1/N (N is a natural number) by varying the numbers of the picture elements which are subsampled.

Referring to FIG. 1(B), description will proceed to an image conversion system according to a fourth embodiment of this invention. The image conversion system according to the fourth embodiment further has a function of enlargement of an image. As illustrated in FIG. 1(B) and described before as the modification, the image conversion system 1' comprises the image enlarging unit 19. The image data compressed in an optional manner is enlarged by the image enlarging unit 19. The image data is thereafter subjected to the image conversion similar to that of the above-mentioned first embodiment.

Referring again to FIG. 2, description will proceed to an image conversion system according to a fifth embodiment of this invention. In the fifth embodiment, the image data input (Step 3), the picture element conversion operation (Step 4) and the image data output (Step 5) are repeatedly carried out corresponding to necessary numbers of the frames. According to the fifth embodiment, the image conversion system of the present invention can be applied to such an image conversion system as having the purpose of displaying sequential frames, such as dynamic images.

Referring now to FIGS. 14 to 19, description will proceed to an image conversion system according to a sixth embodiment of this invention. In the sixth embodiment, input image data is subsampled at regular intervals in a space direction. The image conversion system according to the sixth embodiment comprises a converting section for converting the image processing data into the color information numbers with reference to the second table 7. The image conversion system of the sixth embodiment has a structure similar to that of the first embodiment except that the image input unit 14, the first conversion section 5 and the control unit 18 are modified. Similar portions are defined by like reference numerals.

At first, description is made about data format of the input image data. The data of one picture element is supplied as an input as a Y/Cr/Cb format to the image input unit 14. As to an expression of the one picture element, each one of Y data, Cr data and Cb data is regarded as an input picture element value. Therefore, each four of Y data, Cr data and Cb data are required so as to express four picture elements like the above. However, human visual sense is comparatively insensitive to variation of chrominance components (Cr, Cb). It is generally known that, based on such a characteristic of the human visual sense, Y data, Cr data and Cb data are subsampled to be 4:1:1 to express the above-mentioned four picture elements for the purpose of saving image data quantity.

Figure 14:
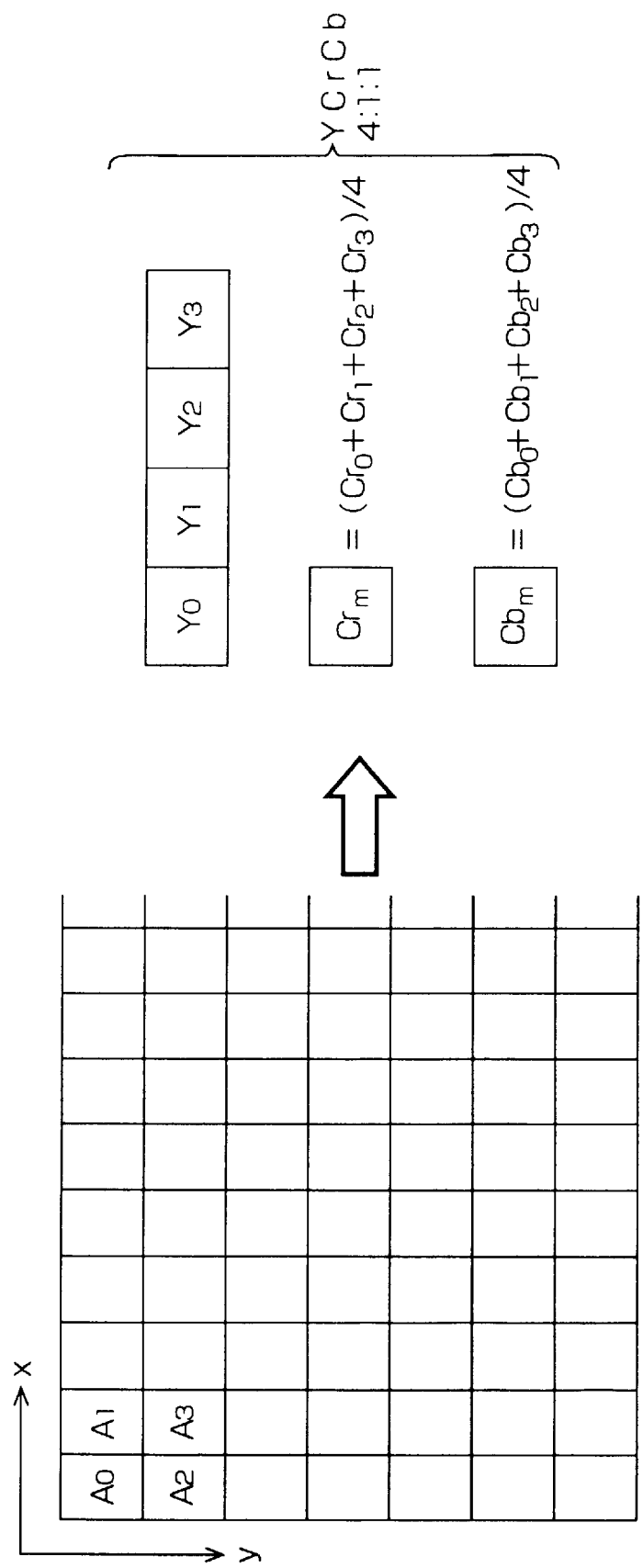
FIG. 14 shows an example of image format in which Cr and Cb data of the original image are subsampled in a space direction.

Referring to FIG. 14, description is made about an example of the subsampling mentioned above.

As illustrated in FIG. 14, four picture elements data of the Y/Cr/Cb format is constructed from four picture elements Y data ($Y_0$–$Y_3$), a mean red value $Cr_m$ of four picture elements Cr data ($Cr_0$–$Cr_3$) and a mean blue value $Cb_m$ of four picture elements Cb data ($Cb_0$–$Cb_3$) among the adjacent four picture elements.

Figure 15:
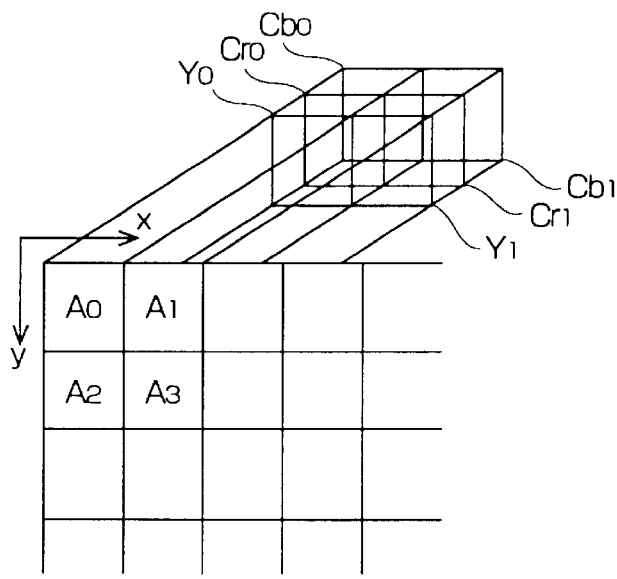
FIG. 15 shows an example of a reconstruction operation of an image by the use of the subsampled CrCb data.

Next, referring to FIG. 15, description is made about interpolation of the above-mentioned data. The four picture elements Y data $Y_0$–$Y_3$ are located at the same positions as those in advance of the subsampling operation. As to the Cr and Cb data, the mean values $Cr_m$ and $Cb_m$ are defined in common to each set of the four picture elements and expressed as follows in combination with the respective four picture elements Y data $Y_0$–$Y_3$.

First picture element [Y=$Y_0$, Cr=$Cr_m$, Cb=$Cb_m$]

Second picture element [Y=$Y_1$, Cr=$Cr_m$, Cb=$Cb_m$]

Third picture element [Y=$Y_2$, Cr=$Cr_m$, Cb=$Cb_m$]

Fourth picture element [Y=$Y_3$, Cr=$Cr_m$, Cb=$Cb_m$]

Thus, the data of Y/Cr/Cb format in a subsampled manner is supplied as an image input data 11 to be stored on the memory 17.

Figure 16:
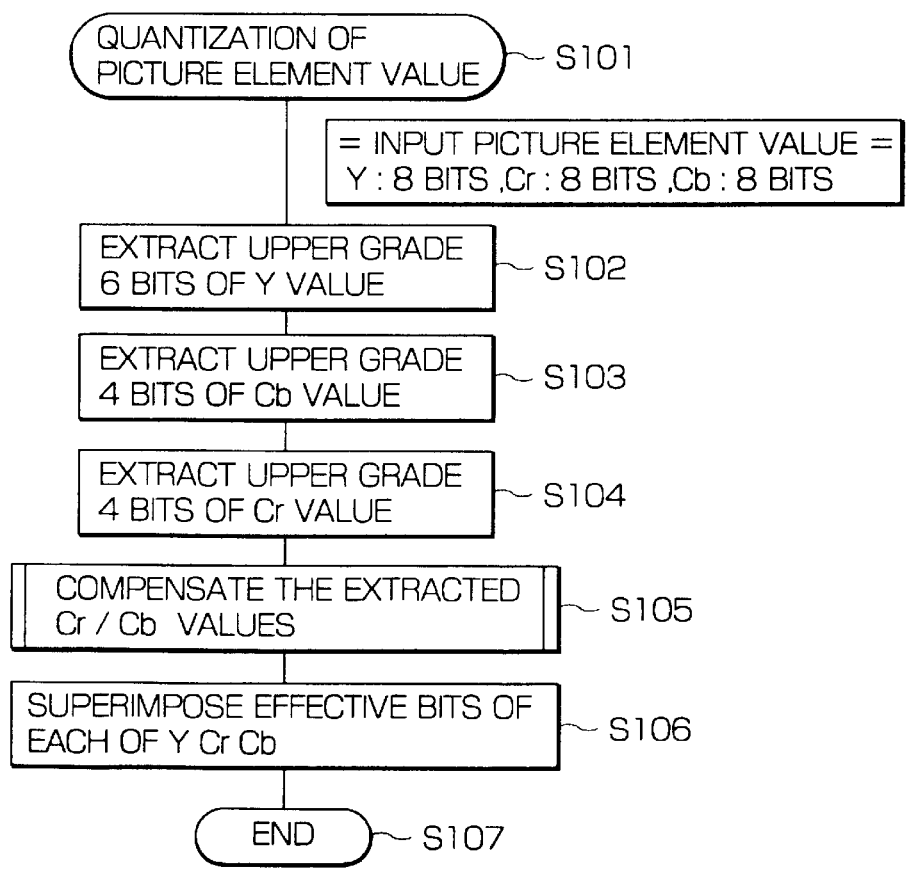
FIG. 16 is a flow chart which shows a modification of the quantization of a picture element value illustrated in FIG. 10.

Referring to FIG. 16, description is made about a flow of operations in the first conversion section 5. The flow chart of FIG. 16 in a modification of FIG. 10 showing the picture element quantization stage in the first embodiment. For the brevity of explanation, the input image data 11 of which chrominance is subsampled to be 4:1:1 is employed among the data of Y/Cr/Cb format as an example of the subsampling mentioned above. FIG. 15 shows a conceptual illustration of the data structure.

For example, let the input picture element value $A_0$ to $A_3$ be defined as follows;

$A_0$ (Y=200, Cb=79, Cr=−123)

$A_1$ (Y=205, Cb=79, Cr=−123)

$A_2$ (Y−199, Cb=79, Cr=−123)

$A_3$ (Y=202, Cb=79, Cr=−123)

In the picture element value quantization stage (FIG. 16), parameters $D_0$ to $D_3$ are produced by the use of these input picture element value $A_0$ to $A_3$.

Next, by the use of these input picture element value $A_0$ to $A_3$ having accuracy of eight bits for each of Y/Cr/Cb, respectively, the picture element value quantization is started (Step 101). In this embodiment, numbers of the effective bits of YCENT are determined to be; Y: 6 bits, Cr: 4 bits and Cb: 4 bits. Accordingly, as to Y of the input picture element value $A_0$, an AND operation between 11001000 (binary numeral for y=200) and 11111100 (binary numeral) is carried out to obtain upper grade 6 bits of Y value (Step 102) as a value of $Y_0$. As to Cb of the input picture element value $A_0$, an AND operation between 01001111 (binary numeral for Cb=79) and 11110000 (binary numeral) is carried out to obtain upper grade 4 bits of Cb value (Step 103) as a value of $Cb_m$. As to Cr of the input picture element value $A_0$, an AND operation between 10000101 (binary numeral for Cr=123) and 11110000 (binary numeral) is carried out to obtain upper grade 4 bits of Cr value (Step 104) as a value of $Cr_m$. Thus, the following values of $Cb_0$ and $Cr_0$ are obtained.

$Cb_0$' 01000000 (binary numeral)

$Cr_0$: 10000000 (binary numeral)

Like the above, as to the value from $A_1$ to $A_3$, similar operations are carried out to obtain the following results.

$Y_1$: 11001100 (binary numeral)

$Y_2$: 11000100 (binary numeral)

$Y_3$: 11001000 (binary numeral)

As to $Cb_m$ and $Cr_m$, the four picture elements bring about respective values identical with each other. Explanation is therefore omitted with respect to the $Cb_m$ and $Cr_m$.

As mentioned above, after the effective bits of the input picture element value are obtained, compensation is carried out with respect to the subsampled Cr and Cb values (Step 105). The compensation operation brings meritorious effects similar to a color space conversion to the Cr and Cb data.

As a result, the following values are obtained.

$Cb_0$: 01010000 (binary numeral)

$Cr_0$: 10010000 (binary numeral)

$Cb_1$: 01000000 (binary numeral)

$Cr_1$: 10000000 (binary numeral)

$Cb_2$: 01000000 (binary numeral)

$Cr_2$: 10010000 (binary numeral)

$Cb_3$: 01000000 (binary numeral)

$Cr_3$: 10010000 (binary numeral)

The following superimposition of bits is carried out by the use of the above values and the values of $Y_0$ to $Y_3$ mentioned above.

Namely, effective bits of each of Y/Cr/Cb are superimposed to each other (Step 106). The super-imposition is realized by an OR operation between each of the Y/Cr/Cb values after the effective bits are obtained and the value of Cr is 8 bits shifted to left, the value of Cb of 4 bits shifted to left, the value of Y, as it is. Thereby the value is produced to be defined a parameter $AD_0$ (=1001010111001000: binary numeral). Similar operations are carried out as to the $A_1$ to $A_3$ to produce the following parameters AD1 (=1000010011001100: binary numeral)

AD2 (=1001010011000100: binary numeral)

AD3 (=1001010011001000: binary numeral)

When the foregoing operations are finished, the picture element value quantization operation comes to an and (Step 107).

Figure 18:
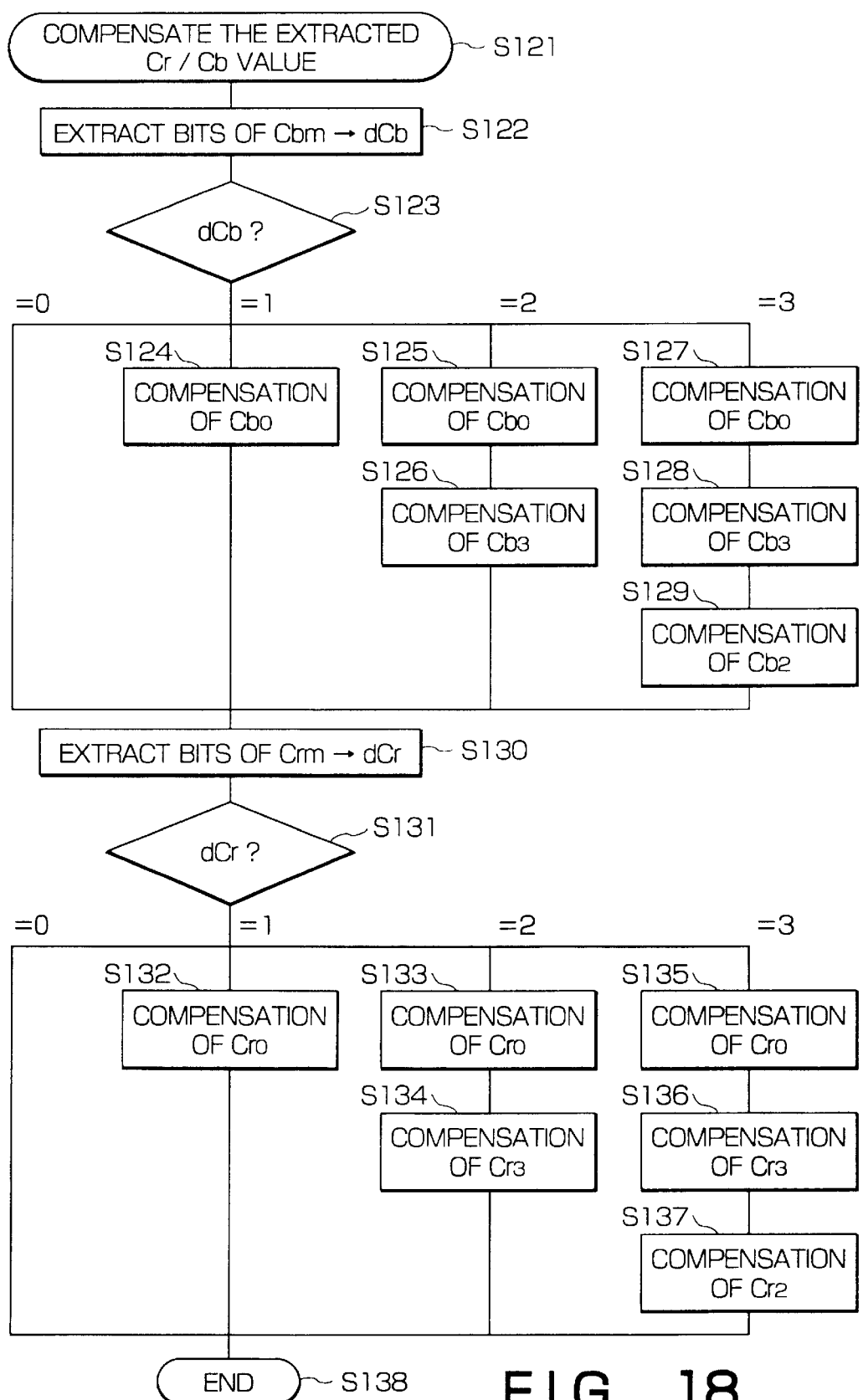
FIG. 18 is a flow chart which shows operation of compensation of Cr and Cb values obtained by extracting only the effective bits.

Referring to FIG. 18, description is made about a flow of operations of compensation of Cr and Cb values in which only the effective bits are obtained.

Figures 19A, 19B, 19C, 19D:
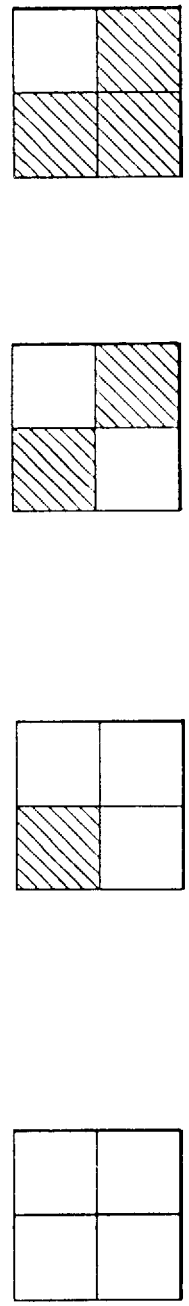
FIG. 19(A) shows an example of a relation of positions of Cb0, Cb3 and Cb2 in the operation of compensation of Cr and Cb values illustrated in FIG. 18, when dCb=0.
FIG. 19(B) shows an example of a relation of positions of Cb0, Cb3 and Cb2 in the operation of compensation of Cr and Cb values illustrated in FIG. 18, when dcb=1.
FIG. 19(C) shows an example of a relation of positions of Cb0, Cb3 and Cb2 in the operation of compensation of Cr and Cb values illustrated in FIG. 18, when dCb=2.
FIG. 19(D) shows an example of a relation of positions of Cb0, Cb3 and Cb2 in the operation of compensation of Cr and Cb values illustrated in FIG. 18, when dCb=3.

The compensation operation is started based on the $Cr_m$ and $Cb_m$ (Step 121). The object bits are, at first, obtained (Step 122) from $Cb_m$. As the Cb has the effective bits in its upper grade 4 bits, the two bits next to the effective bits are herein obtained to be defined as a parameter dCb. If the Cb has the effective bits in its upper grade 5 or 6 bits, two bits next to the effective bits are similarly obtained to be defined as the parameter dCb. However, the same operation is not applicable to the case that the Cb has the effective bits in its upper grade 7 or 8 bits. The parameter dCb ranges the values 0 to 3 and is used for enhancing accuracy of the upper grade 4. bits. An AND operation is carried out between $Cb_m$ 01001111 (binary numeral) and a value 00001100 (binary numeral). The resultant value is 2 bits shifted to right to produce the value of dCb, that is 3 (=00000011: binary numeral). Next, compensation of the values of $Cb_0$ to $Cb_3$ is carried out based on the value of dCb (Steps 124–129). Description is now made about an operation of the compensation. The compensation is generally realized by addition of 1 to the lowest bit of the effective bits of $Cb_0$ to $Cb_3$. As the effective bits of $Cb_0$ to $Cb_3$ are 4 bits in this embodiment, the compensation is realized by addition of 00010000 (binary numeral) to the lowest bit of the effective bits of $Cb_0$ to $Cb_3$. As the value of dCb is 3 in this embodiment, Steps 127 to 129 are carried out. The operation of the compensation is carried out with respect to the $Cb_0$, $Cb_3$, $Cb_2$. The position of those picture elements are depicted in FIG. 19(D) with hatching lines among the subjected four picture elements. Similarly, the operations of the compensation are carried out with respect to the $Cb_0$ shown in FIG. 19(B) when the value of dCb is 1, while on the $Cb_0$ and the $Cb_3$ shown in FIG. 19(C) when the value of dCb is 2. On the other hand, no operation of the compensation is carried out as shown in FIG. 19(A) when the value of dCb is 0.

Further, similar operation is carried out with respect to the Cr (Steps 132 to 137). The operations of the compensation for the obtained values Cr and Cb come to an end (Step 138). As a result, the following values can be obtained, as mentioned above.

$Cb_0$: 01010000 (binary numeral)

$Cr_0$: 10010000 (binary numeral)

$Cb_1$: 01000000 (binary numeral)

$Cr_1$; 10000000 (binary numeral)

$Cb_2$: 01000000 (binary numeral)

$Cr_2$: 1001000 (binary numeral)

$Cb_3$: 01000000 (binary numeral)

$Cr_3$: 10010000 (binary numeral)

In this embodiment, an order of compensation of the values is, for example, $Cb_0$, $Cb_3$, $Cb_2$. However, the order is not restricted thereto. The order may alternatively $Cb_2$, $Cb_1$, $Cb_0$. Thereafter, operations similar to those of the first embodiment are carried out.

Figure 17:
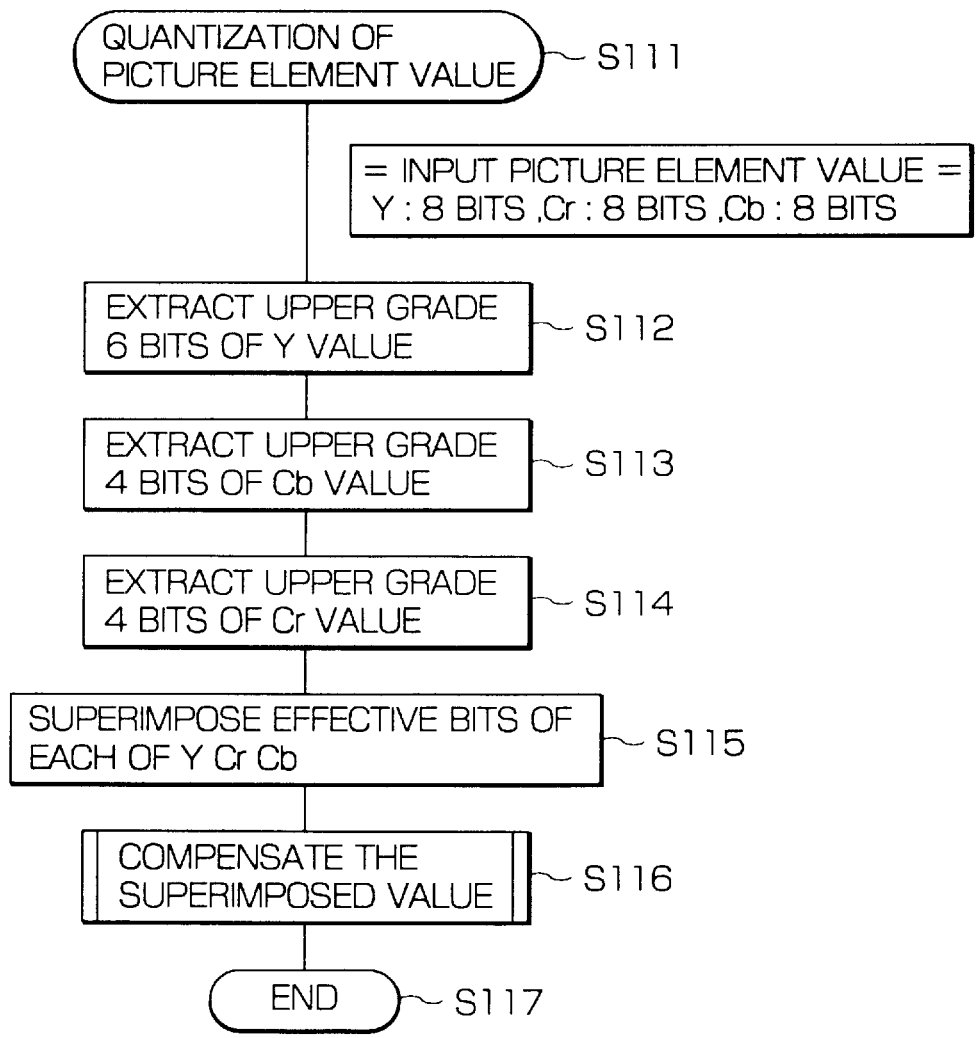
FIG. 17 is a flow chart which shows another modification of the quantization of a picture element value illustrated in FIG. 10.

Referring to FIG. 17, description will proceed to a modification of the picture element quantization stage (FIG. 16). In this embodiment, after the superimposition of effective bits of each of Y/Cr/Cb (Step 115), compensation of the superimposed value is carried out (Step 116) to obtain $AD_0$ to $AD_3$ like the operation shown in FIG. 16. In this embodiment, Steps 111 to 114 are the same as Steps 101 to 104 shown in FIG. 16 while Step 115 is the same as Step 95 shown in FIG. 10 of the first embodiment.

For example, let the input picture element value $A_0$ to $A_3$ be defined as follows;

$A_0$ (Y=200, Cb=79, Cr=−123)

$A_1$ (Y=205, Cb=79, Cr=−123)

$A_2$ (Y=199, Cb=79, Cr=−123)

$A_3$ (Y=202, Cb=79, Cr=−123).

Further, it is assumed that each of the effective bite is superimposed.

Parameter $AD_0$ (=1000010011001000: binary numeral)

Parameter $AD_1$ (=1000010011001100: binary numeral)

Parameter $AD_2$ (=1000010011000100: binary numeral)

Parameter $AD_3$ (=1000010011001000: binary numeral)

In the compensation stage of the superimposed value (Step 116), the compensation is realized by addition of 1 to the lowest bit of the effective bits of $Cb_0$ to $Cb_3$ and $Cr_0$ to $Cr_3$. As the effective bits of $Cb_0$ to $Cb_3$ and $Cr_0$ to $Cr_3$ are 4 bits in this embodiment, the compensation is realized by addition of 00010000 (binary numeral) to the lowest bit of the effective bits of $Cb_0$ to $Cb_3$ and $Cr_0$ to $Cr_3$. Therefore, the compensation of Cb is realized by addition of 00000001000000 (binary numeral) to the value of AD. On the other hand, the compensation of Cr is realized by addition of 0001000000000000 (binary numeral) to the value of AD. Accordingly, dCb is produced by the manner similar to Step 122. As a result, no operation is made when the value of dCb=0. A compensation of $AD_1$ is made when the value of dCb=1. A compensation of $AD_1$ and $AD_3$ is made when the value of dCb=2. A compensation of $AD_1$, $AD_3$ and $AD_2$ is made when the value of dCb=3. Similarly, dCr is produced. As a result, no operation is made when the value of dCr=0. A compensation of $AD_1$ is made when the value of dCr=1. A compensation of $AD_1$ and $AD_3$ is made when the value of dCr=2. A compensation of $AD_1$, $AD_3$ and $AD_2$ is made when the value of dCr=3.

In this embodiment, an order of compensation of the values is, for example, $AD_0$, $AD_3$, $AD_2$. However, the order is not restricted thereto. The order may alternatively $AD_2$, $AD_1$, $AD_0$.

As a result, the following values of the parameters $AD_0$ to $AD_3$ are obtained.

Parameter $AD_0$ (=1001010111001000: binary numeral)

Parameter $AD_1$ (=1000010011001100: binary numeral)

Parameter $AD_2$ (=1001010011000100: binary numeral)

Parameter $AD_3$ (=1001010011001000: binary numeral)

Thus, compensation stage of the superimposed values is finished and the picture element value quantization stage comes to an end (Step 117)

As described above, according to this invention, assignment to the representative colors as well as conversion of coordinates from a color apace dependent on the image input device into another color space dependent on the image output device are carried out at the same time with reference to tables. Therefore, it becomes a short time for each of the picture elements to be processed, even if conversion of many picture elements is required.

Further, according to this invention, representative colors independent from the input image are selected. It does not require the time to execute conversion of CLUT and assignment of colors to the image, when a plurality of images are displayed at the same time on the same color display. Consequently, image conversion is carried out at a high speed.

Furthermore, conversion of CLUT is not required when a plurality of images are displayed at the same time on the same color display. The reason is also that the representative colors independent from the input image are selected. In addition, shortage of colors to be displayed due to difference of necessary colors between different images is not caused to occur. Accordingly, it becomes possible to provide images with high reproducibility.

While this invention has thus far been described in specific conjunction with only several embodiments thereof, it will now be readily possible for one skilled in the art to put this invention into effect in various other manners.

What is claimed is:

1. An image conversion system for converting image input data to image output data corresponding to a reproduced image, comprising:

image input means for supplying said image input data;

image output leans for outputting said image output data;

a first table which corresponds a plurality of color information numbers, said plurality of color information numbers being dependent on said image output means, with a plurality of color information to be output by said image output means as said image output data;

a second table which corresponds said image input data supplied from said image input means with said plurality of color information numbers in said first table, said correspondence being based on a result of a dither operation;

first conversion means for converting said image input data into corresponding ones of said plurality of color information numbers with respective picture element positions in said reproduced image, with reference to said second table; and second conversion means for converting said corresponding ones of said plurality of color information numbers, from said first conversion means, into a corresponding plurality of color information corresponding to said reproduced image, with reference to said first table.

2. An image conversion system as claimed in claim 1, wherein said image input data is subsampled at regular intervals in a space direction, said first conversion means comprising additional conversion means for converting said subsampled image input data into said corresponding ones of said plurality of color information numbers, with reference to said second table.

3. An image conversion system as claimed in claim 1, wherein at least either said first table or said second table is previously prepared.

4. An image conversion system as claimed in claim 1, further comprising third conversion means which produces an enlarged reproduced image with said corresponding ones of said plurality of color information numbers from said first conversion means.

5. An image conversion system as claimed in claim 1, further comprising third conversion means which produces a reduced reproduced image with said corresponding ones of said plurality of color information numbers from said first conversion means.

6. An image conversion system as claimed in claim 1, further comprising third conversion means which alternates a writing mode of said image input data dependent on an output position to said image output means.

7. An image conversion system as claimed in claim 1, further comprising:

first table making means for making said first table; and second table making means for making said second table from said first table.

8. An image conversion system as claimed in claim 1, wherein said image input data is compressed by a predetermined compression algorithm to produce a compressed image input data, said first conversion means comprising:

data processing means for extending said compressed image input data in accordance with a predetermined extension algorithm to produce an image processing data of a format following a color space dependent on said data processing means; and additional conversion means for converting said image processing data into said corresponding ones of said plurality of color information numbers, with reference to said second table.

9. An image conversion system as claimed in claim 8, wherein said image input data is subsampled at regular intervals in a space direction.

10. An image conversion system comprising:

image input means for supplying image input data;

image output moans for outputting image output data;

a first table which corresponds a plurality of color information numbers, said plurality of color information numbers being dependent on said image output means, with a plurality of color information to be output by said image output loans as said image output data;

a second table which corresponds said image input data supplied from said image input means, said image input data including data corresponding to a position of a picture element in an image to be displayed, with said plurality of color information numbers in said first table;

first conversion means for converting said image input data and said position of picture element into corresponding ones of said plurality of color information numbers, with reference to said second table; and second conversion means for converting said corresponding ones of said plurality of color information numbers into a corresponding plurality of color information, with reference to said first table.

11. An image conversion system comprising:

image input means for supplying image input data;

image output means for outputting image output data;

a first table which corresponds a plurality of color information numbers, said plurality of color information numbers being dependent on said image output means, with a plurality of color information to be output by said image output means as said image output data;

a second table which corresponds said image input data supplied from said image input means, said image input data including data corresponding to a position of a picture element in an image to be displayed, with said plurality of color information numbers from said first table, said correspondence of said second table providing an area modulation of colors;

first conversion means for converting said image input data and said position of picture element into corresponding ones of said plurality of color information numbers, with reference to said second table; and second conversion means for converting said corresponding ones of said plurality of color information numbers into a corresponding plurality of color information, with reference to said first table.

12. An image conversion system comprising:

an image input unit configured to provide image input data, the image input data corresponding to a first color space;

an image output unit configured to receive image output data, the image output data corresponding to a second color space different from the first color space;

an output table having a plurality of entries, each of the plurality of entries of the output table including color information corresponding to the second color space, the output table being indexed in accordance with color information indices determined in accordance with the second color space;

a conversion table having a plurality of entries, each of the plurality of entries of the conversion table including a color information index for accessing one of the plurality of entries in the output table, the conversion table being indexed in accordance with indices determined in accordance with the first color space;

a first converter configured to receive the image input data, said first converter determining corresponding indices for the conversion table based on the image input data, accessing the conversion table based on the determined corresponding indices, and outputting corresponding color information indices from the conversion table as intermediate image output data; and a second converter configured to receive the intermediate image output data, the second converter accessing the output table based on the corresponding color information indices in the intermediate image output data, and outputting corresponding color information from the output table as the image output data.

13. An image conversion system according to claim 12, wherein the conversion table includes n entries for each predetermined color in the first color space, where n is an integer of one or more, and where the color information index for each of the n entries is based on a predetermined dither operation, and wherein the first converter selects an appropriate one of the n entries based on a picture element position.

14. A method of converting image input data corresponding to a first color space into image output data corresponding to a second color space, different from the first color space, the method comprising the steps of:

(A) providing an output table with color information corresponding to the second color space;

(B) providing a conversion table which relates the first color space to the color information in the output table and providing n entries in the conversion table for each predetermined color in the first color space, where n is an integer of one or more, and where each of the n entries is based on a predetermined dither operation;

(C) converting the image input data, corresponding to the first color space, into intermediate image output data, which corresponds with the output table, in accordance with the conversion table and selecting an appropriate one of the n entries, for the intermediate image output data, based on a picture element position; and (D) converting the intermediate image output data into the image output data, corresponding to the second color space, in accordance with the output table.

* * * * *